(12) United States Patent  
Cho (10) Patent No.: US 12,522,278 B2  
(45) Date of Patent: Jan. 13, 2026

(54) STEER BY WIRE TYPE STEERING APPARATUS

(71) Applicant: HL MANDO CORPORATION, Gyeonggi-do (KR)

(72) Inventor: Seong Jong Cho, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 706 days.

(21) Appl. No.: 17/831,142

(22) Filed: Jun. 2, 2022

(65) Prior Publication Data

US 2022/0388567 A1    Dec. 8, 2022

(30) Foreign Application Priority Data

Jun. 4, 2021    (KR) .......................... 10-2021-0072531

(51) Int. Cl.
    *B62D 5/04*    (2006.01)
(52) U.S. Cl.
    CPC .......... *B62D 5/0415* (2013.01); *B62D 5/0454* (2013.01); *B62D 5/0469* (2013.01)
(58) Field of Classification Search
    CPC .......... B62D 3/12; B62D 5/001; B62D 5/005; B62D 5/006; B62D 5/0409; B62D 5/0415; B62D 5/0454; B62D 5/0463; B62D 5/0469; B62D 6/00
    USPC ........................................................ 180/444
    See application file for complete search history.

(56) References Cited

FOREIGN PATENT DOCUMENTS

| DE | 10 2019 202 294 | | 8/2020 |
| DE | 102019202294 A1 | * | 8/2020 |
| EP | 0 936 379 | | 8/1999 |
| JP | 2016-60246 | | 4/2016 |
| JP | 2016060246 A | * | 4/2016 |

OTHER PUBLICATIONS

Office Action dated Feb. 6, 2023 for German Patent Application No. 10 2022 205 651.5 and its English machine translation provided by Google Translate.
Office Action dated Oct. 21, 2025 for Korean Patent Application No. 10-2021-0072531 and its English translation provided by Applicant's foreign counsel.

* cited by examiner

*Primary Examiner* — Valentin Neacsu  
*Assistant Examiner* — Felicia L. Brittman-Alabi  
(74) *Attorney, Agent, or Firm* — WOMBLE BOND DICKINSON (US) LLP (57) ABSTRACT

Embodiments of the present disclosure provide a sun gear coupled to a steering shaft connected to a steering wheel operated by a driver and rotating in interlocking motion, a planetary gear externally coupled to the sun gear, a ring gear to which the planetary gear is internally coupled, a first support protrusion is provided at one end of the axial direction, and is coupled to and fixed to an inner circumferential surface of a gear housing, and a carrier to which a rotation shaft of the planetary gear is coupled and provided with a second support protrusion supported by the first support protrusion on an outer circumferential side.

16 Claims, 10 Drawing Sheets

STEER BY WIRE TYPE STEERING APPARATUS

CROSS REFERENCE TO RELATED APPLICATION

This application claims priority from. Korean Patent Application No. 10-2021-0072531, filed on Jun. 4, 2021, which is hereby incorporated by reference for all purposes as if fully set forth herein.

TECHNICAL FIELD

Embodiments of the present disclosure relate to a steer by wire steering system, and more particularly, to a steer by wire type steering apparatus capable of mechanically stopping the steering wheel from rotating further when the rotation of the vehicle wheel reaches its maximum point.

DESCRIPTION OF RELATED ART

In general, power steering has been developed and applied to a vehicle steering system to provide convenience in driving operation by assisting a driver's operating force of a steering wheel. Power steering was developed and applied in hydraulic type using hydraulic pressure, electro-hydraulic type using hydraulic pressure and electric power of the motor at the same time, and electric type using only electric power of the motor.

Recently, instead of removing a mechanical connection device such as a steering column or a universal joint or a pinion shaft between the steering wheel and the vehicle wheel, the Steer By Wire (SBW) type steering system for steering a vehicle using an electric motor has been developed and applied.

However, in the case of such a steer by wire type steering system, since there is no mechanical connection between the steering shaft and the vehicle wheels, the driver's steering wheel rotation can rotate indefinitely, thereby reducing the driver's steering feeling and steering stability.

Therefore, when the rotation of the vehicle wheel reaches its maximum point (when the steering wheel or the vehicle wheel is in a full-turn state in a general steering system), there is a need for research to prevent the steering wheel from rotating any more.

BRIEF SUMMARY

Embodiments of the present disclosure provide a steer by wire steering device capable of increasing a driver's steering feel and steering stability by preventing the steering wheel from mechanically rotating anymore when the rotation of the vehicle wheel reaches the maximum point.

In addition, the purpose of the embodiments of the present disclosure are not limited thereto, and other objects not mentioned will be clearly understood by those skilled in the art from the following description.

Embodiments of the present disclosure provide a sun gear coupled to a steering shaft connected to a steering wheel operated by a driver and rotating in interlocking motion, a planetary gear externally coupled to the sun gear, a ring gear to which the planetary gear is internally coupled, a first support protrusion is provided at one end of the axial direction, and is coupled to and fixed to an inner circumferential surface of a gear housing, and a carrier to which a rotation shaft of the planetary gear is coupled and provided with a second support protrusion supported by the first support protrusion on an outer circumferential side.

According to embodiments of the present disclosure, there is provided a steer by wire type steering apparatus that increases a driver's steering feel and steering safety by preventing the steering wheel from mechanically rotating anymore when the rotation of the vehicle wheel reaches the maximum point.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
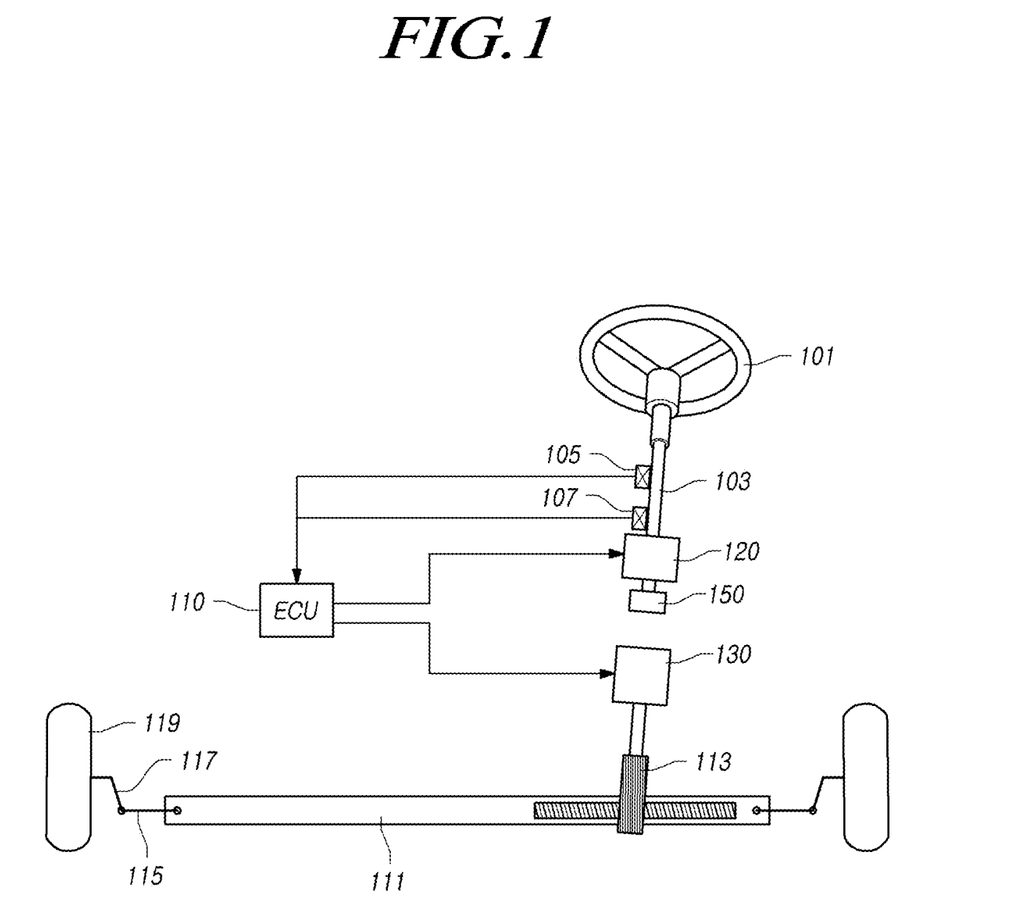
FIG. 1 is a schematic view illustrating a steer by wire type steering apparatus according to embodiments of the present disclosure.
Figure 2:
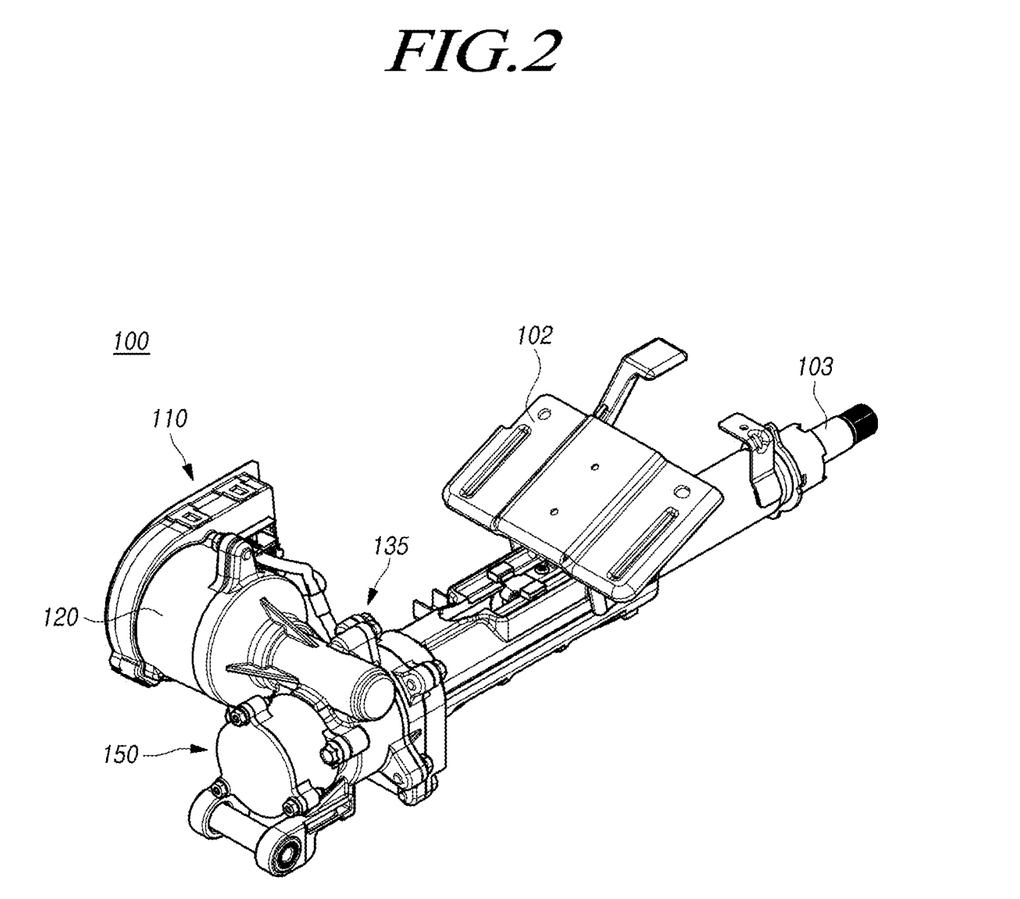
FIG. 2 is a perspective view illustrating a steer by wire type steering apparatus according to embodiments of the present disclosure.
Figure 3:
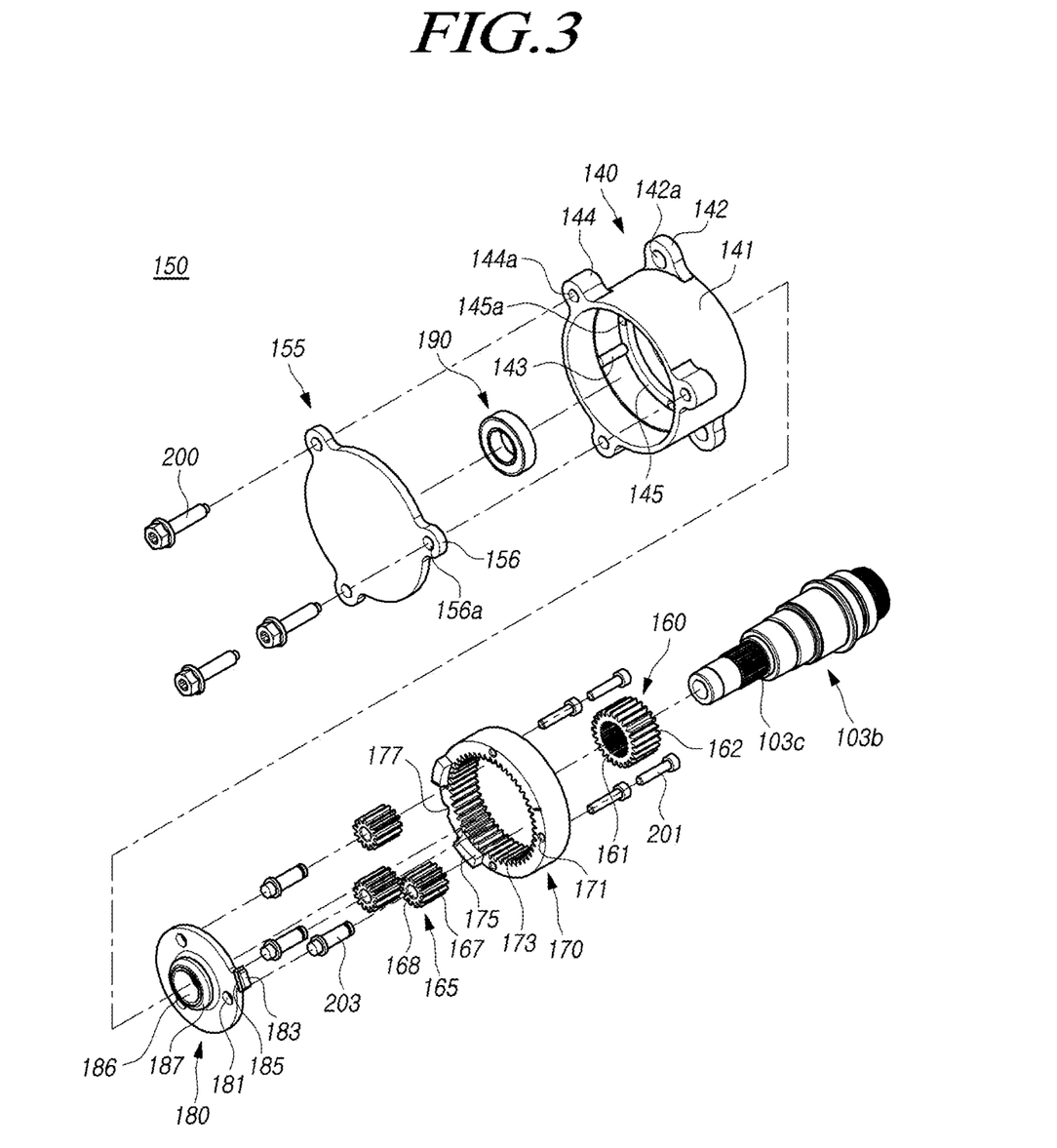
FIGS. 3 and 4 are exploded perspective views illustrating a steer by wire type steering apparatus according to embodiments of the present disclosure.
Figure 4:
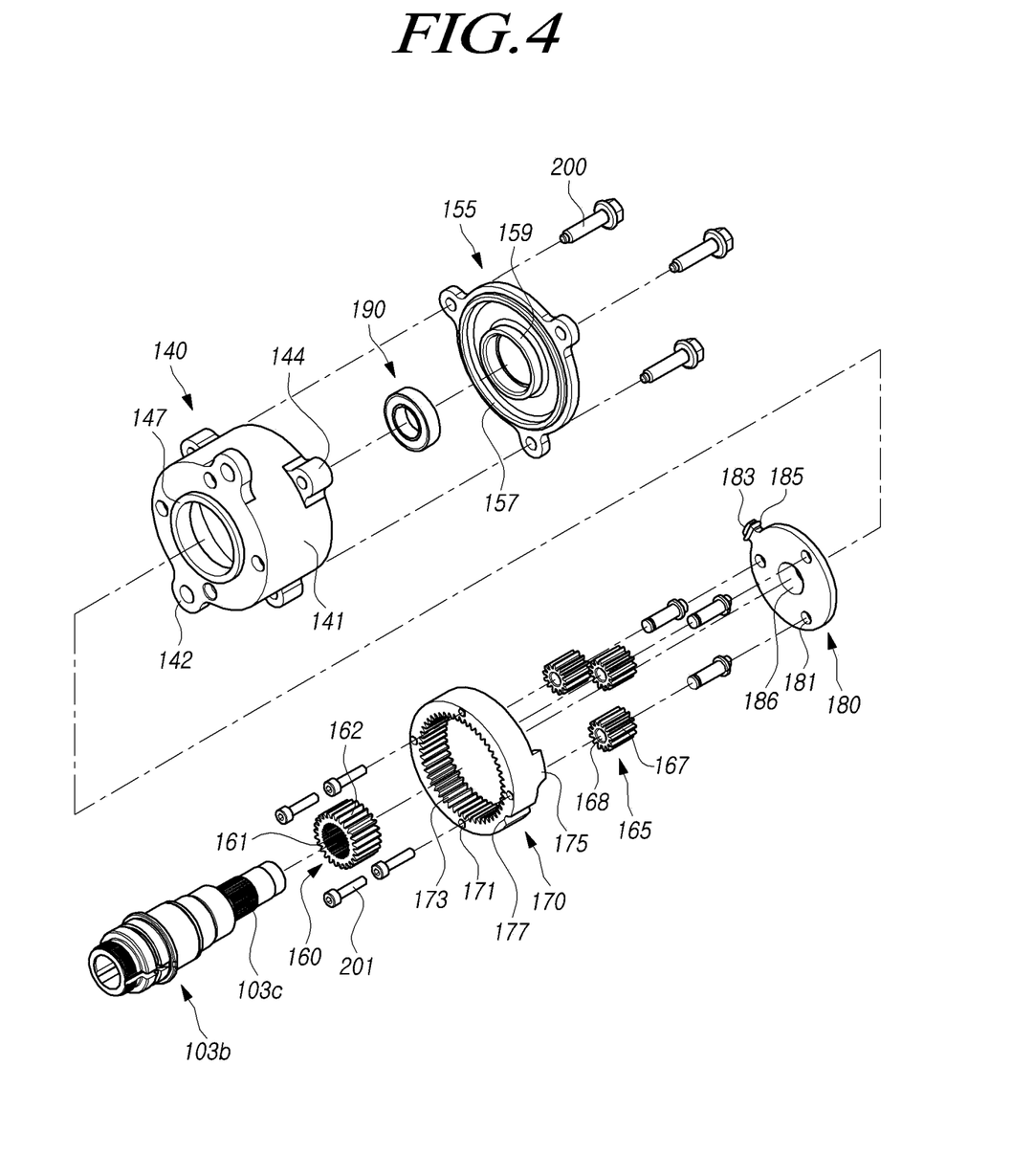
Figure 5:
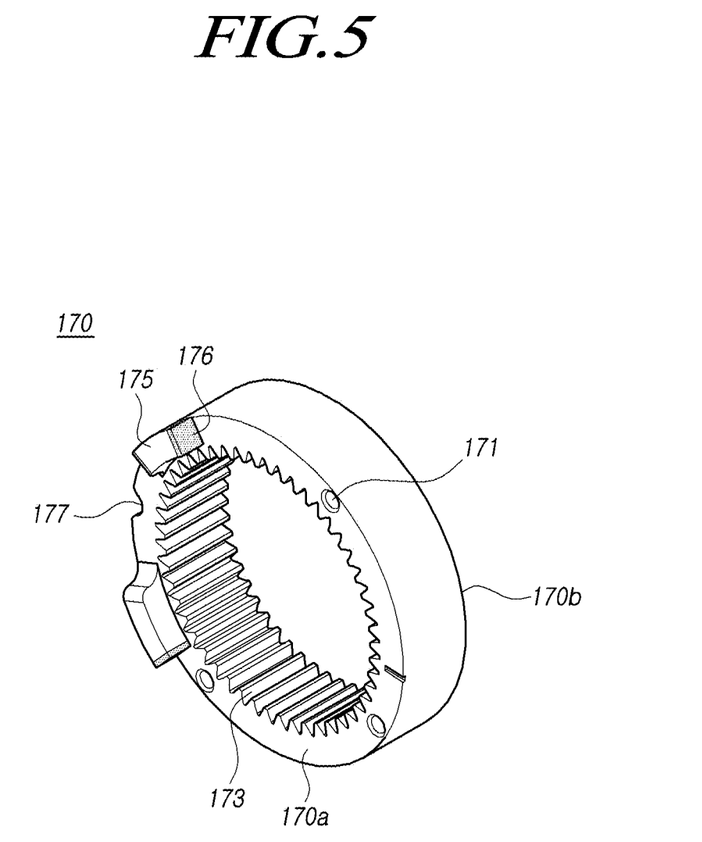
FIGS. 5 to 7 are perspective views illustrating a steer by wire type steering apparatus according to embodiments of the present disclosure.
Figure 6:
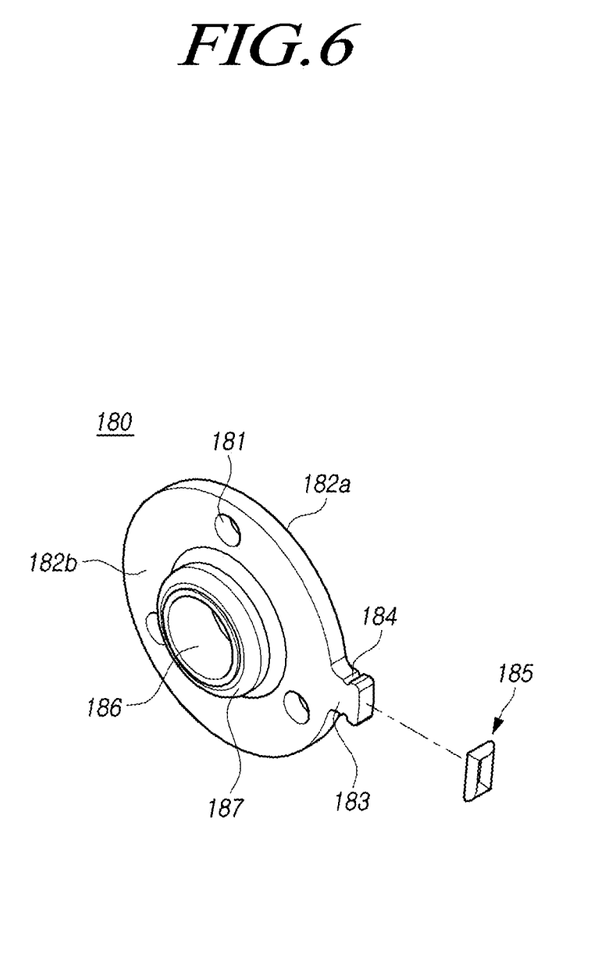
Figure 7:
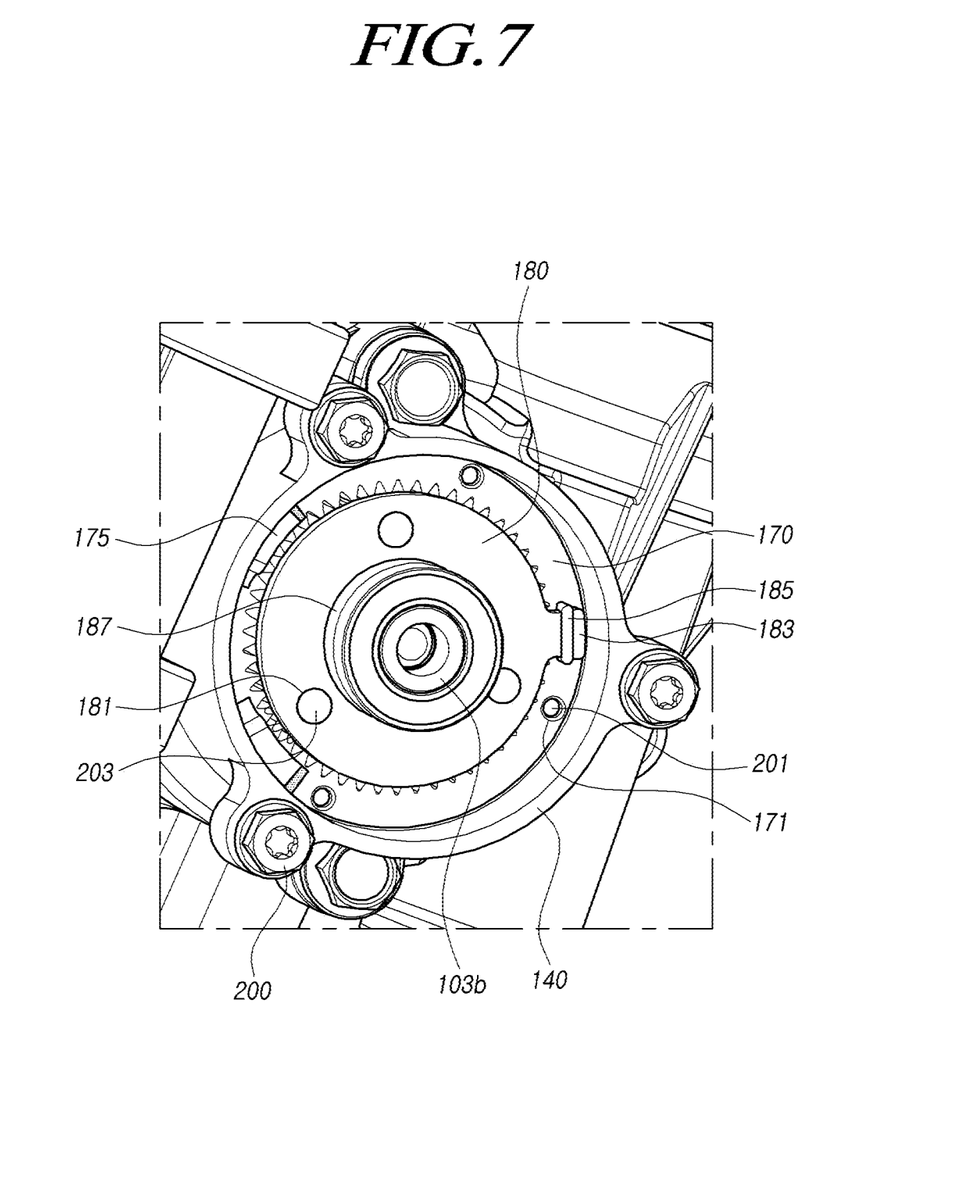
Figure 8:
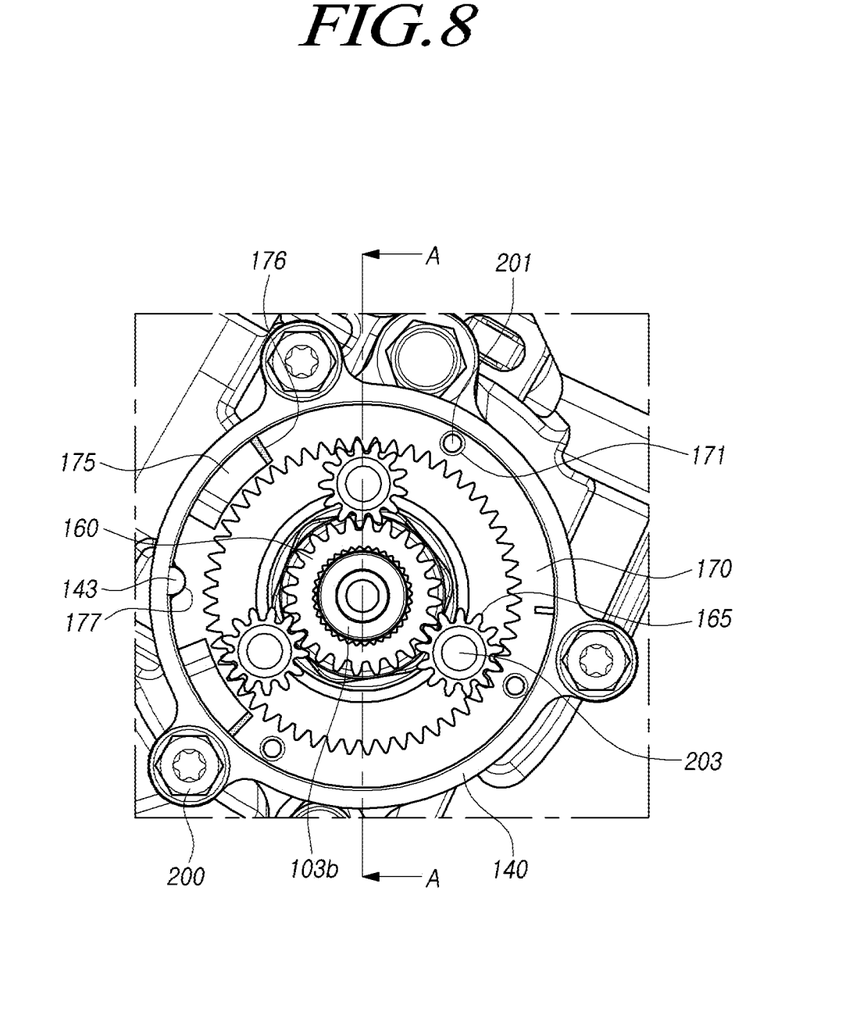
FIG. 8 is a front view illustrating a steer by wire type steering apparatus according to embodiments of the present disclosure.
Figure 9:
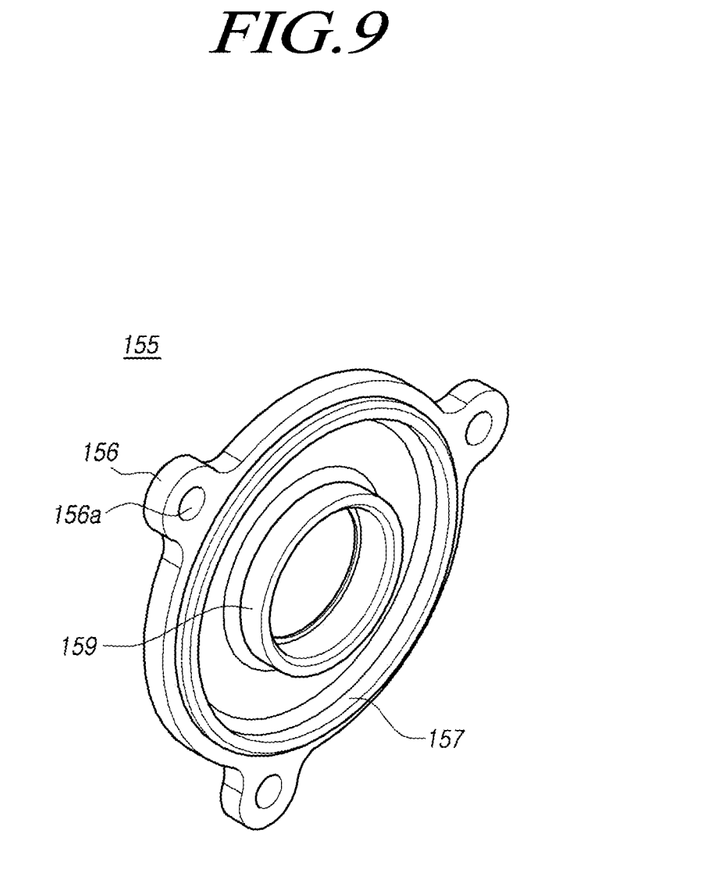
FIG. 9 is a perspective view illustrating a steer by wire type steering apparatus according to embodiments of the present disclosure.
Figure 10:
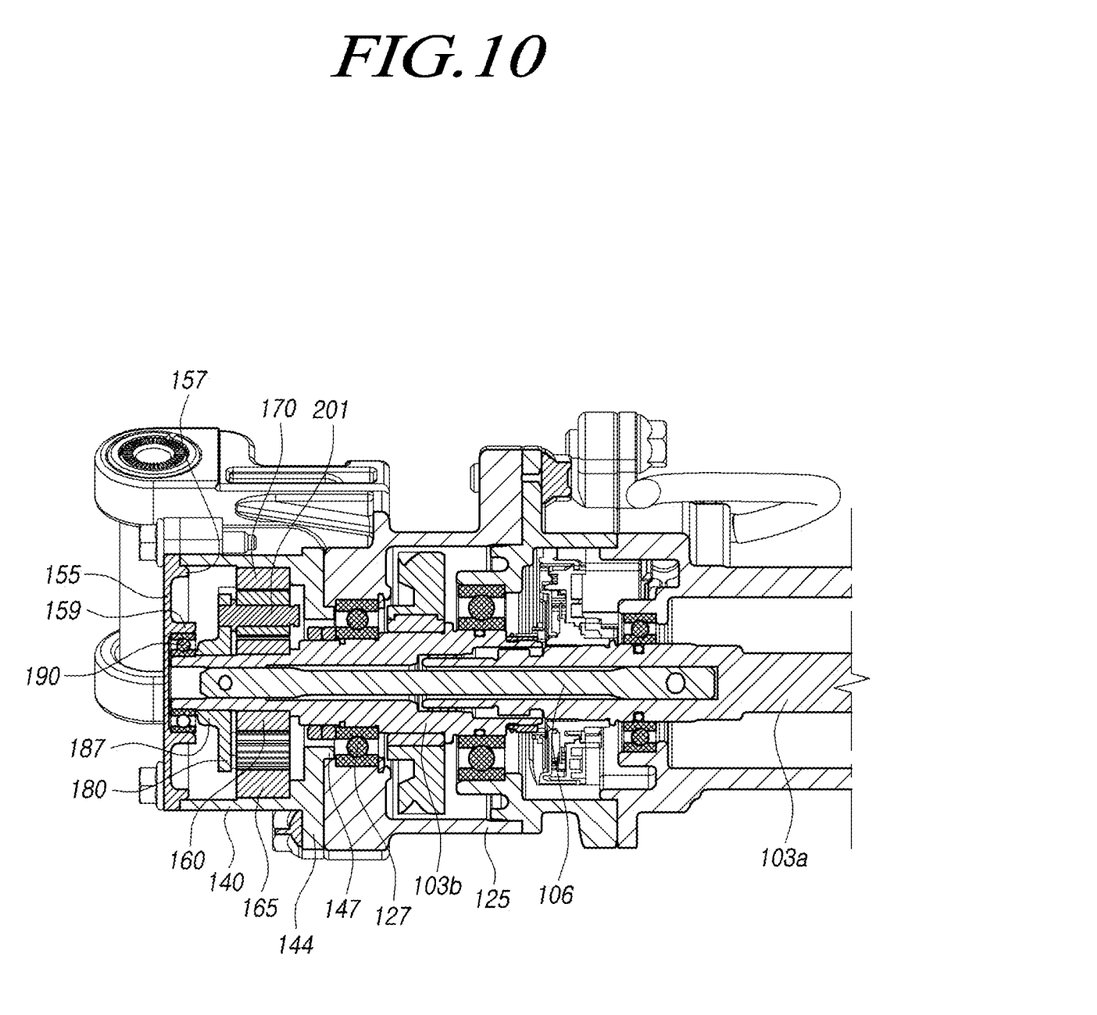
FIG. 10 is a cross sectional view illustrating a portion A-A of FIG. 8.

FIG. 1 is a schematic view illustrating a steer by wire type steering apparatus according to embodiments of the present disclosure, FIG. 2 is a perspective view illustrating a steer by wire type steering apparatus according to embodiments of the present disclosure, FIGS. 3 and 4 are exploded perspective views illustrating a steer by wire type steering apparatus according to embodiments of the present disclosure, FIGS. 5 to 7 are perspective views illustrating a steer by wire type steering apparatus according to embodiments of the present disclosure, FIG. 8 is a front view illustrating a steer by wire type steering apparatus according to embodiments of the present disclosure, FIG. 9 is a perspective view illustrating a steer by wire type steering apparatus according to embodiments of the present disclosure, FIG. 10 is a cross sectional view showing a portion A-A of FIG. 8.

Referring to FIGS. 1 to 10, a steer by wire type steering apparatus according to embodiments of the present disclosure may include a sun gear 160 coupled to a steering shaft 103 connected to a steering wheel 101 operated by a driver and rotating in interlocking motion, a planetary gear 165 externally coupled to the sun gear 160, a ring gear 170 to which the planetary gear 165 is internally coupled, a first support protrusion 175 is provided at one end of the axial direction, and is coupled to and fixed to an inner circumferential surface of a gear housing 140, and a carrier 180 to which a rotation shaft 203 of the planetary gear 165 is coupled and provided with a second support protrusion 183 supported by the first support protrusion 175 on an outer circumferential side.

First, referring to FIG. 1, in the steer by wire type steering apparatus according to embodiments of the present disclosure, an angle sensor 105 and a torque sensor 107 on one side of a steering shaft 103 connected to a steering wheel 101 is coupled to detect the driver's manipulation of the steering wheel 101, then the angle sensor 105 and the torque sensor 107 transmit electrical signals to the electronic control device 110 to operate the steering shaft motor 120 and the pinion shaft motor 130.

The electronic control device 110 controls the steering shaft motor 120 and the pinion shaft motor 130 based on the electrical signals transmitted from the angle sensor 105 and the torque sensor 107 and the electrical signals transmitted from other sensors mounted on the vehicle.

The steering shaft motor 120 is connected to a speed reducer 135 for reducing the number of revolutions of the motor, and provides a reaction force to the steering shaft 103 so as to feel a steering reaction force in the opposite direction when the driver operates the steering wheel 101 during normal driving. And during autonomous driving, steering is performed by the control of the electronic control device 110 without the driver's will.

The pinion shaft motor 130 slides the rack bar 111 connected to the pinion shaft 113 to steer the vehicle wheels 119 on both sides through the tie rod 115 and the knuckle arm 117.

However, in the drawings in embodiments of the present disclosure, for convenience of explanation, the angle sensor 105 and the torque sensor 107 are provided on the steering shaft 103 as an example, but a vehicle speed sensor and a motor position sensor for transmitting steering information to the electronic control device 110, various radars, LIDAR, image sensors such as a camera, etc. may be provided, and a detailed description thereof will be omitted below.

In such a steer by wire type steering apparatus, since the steering wheel 101 and the vehicle wheel 119 are not mechanically connected, when the driver manipulates the steering wheel 101, a mechanical restriction is required to stop the rotation of the steering wheel 101 at a certain angle.

That is, when the rotation of the vehicle wheel 119 reaches the maximum point (in a general steering device, when the steering wheel 101 or the wheel 119 is in a full-turn state), the rotation angle limiting member 150 for mechanically limiting the rotation angle of the steering shaft 103 is provided so that the steering wheel 101 is not rotated any more. Thus, it provides the driver with an accurate steering feeling.

The rotation angle limiting member 150 includes a sun gear 160 is provided at a lower end of a steering column 100 coupled to the vehicle body with a mounting bracket 102 and is coupled to the steering shaft 103 to rotate in conjunction, a planetary gear 165 coupled to the sun gear 160, a ring gear 170 coupled to the planetary gear 165, and carrier 180.

The steering shaft 103 is coupled to the input shaft 103a and the output shaft 103b via the torsion bar 106, one or more shafts may be additionally connected, and the sun gear 160 is coupled to the outer peripheral surface of the output shaft 103b.

Serrations 103c and 161 corresponding to each other are provided on the outer peripheral surface of the output shaft 103b and the inner peripheral surface of the sun gear 160, so that when the steering shaft 103 is rotated, the output shaft 103b and the sun gear 160 are interlocked and rotate without slipping.

The planetary gear 165 externally coupled to the sun gear 160 has a shaft hole 168 to which the rotation shaft 203 is coupled. A planetary gear teeth 167 meshing with the sun gear teeth 162 formed on the outer peripheral side of the sun gear 160 are formed on the outer peripheral side of the planetary gear 165.

A ring gear teeth 173 meshing with the planetary gear teeth 167 is formed on the inner peripheral side of the ring gear 170 to which the planetary gear 165 is internally coupled.

Accordingly, when the sun gear 160 is rotated, the planetary gear 165 performs a rotational motion and an orbital motion, and a first support protrusion 175 formed to protrude in the axial direction is provided at one end of the ring gear 170 in the axial direction.

In the carrier 180, a shaft hole 181 to which the rotation shaft 203 of the planetary gear 165 is coupled is formed to pass through one end and the other end of the carrier 180 and a second support protrusion 183 protruding in a radial direction is formed on the outer peripheral side of the carrier 180.

Accordingly, the second support protrusion 183 of the carrier 180 rotated by the sun gear 160 and the planetary gear 165 is supported by the first support protrusion 175 of the ring gear 170 and rotation is limited.

The first support protrusion 175 is formed to protrude in the axial direction from one end of the ring gear 170 in the axial direction. The inner circumferential side of the first support protrusion 175 is formed to be radially spaced apart from the outer circumferential side of the carrier 180.

One or more of these first support protrusions 175 may be provided at one end of the ring gear 170 in the axial direction. In embodiments of the present disclosure, it is shown as an example that two first support protrusions 175 are provided at positions adjacent to each other in the circumferential direction.

Here, the number of the first support protrusions 175 may be determined in consideration of the gear ratio of the sun gear 162, the planetary gear 167, and the ring gear 173 and the rotation angle of the steering shaft 103.

In addition, one or more first dampers 176 that are supported by the second support protrusions 183 of the carrier 180 and elastically deformed may be provided on the circumferential side surface of the first support protrusions 175.

Here, when one first support protrusion 175 is provided, the first damper 176 is provided on both sides of the first support protrusion 175 in the circumferential direction, and when two or more first support protrusions 175 are provided, as shown in embodiments of the present disclosure, they may be provided only on one side of each of the first support protrusions 175.

The second support protrusion 183 is formed to protrude from the outer peripheral side of the carrier 180 in the radial direction and the radial end of the second support protrusion 183 is formed to be radially spaced apart from the inner periphery of the gear housing 140.

Moreover, the second support protrusion 183 may be provided with a second damper 185 supported by the first support protrusion 175 and elastically deformed and the second damper 185 may be provided on one side and the other side of the second support protrusion 183, respectively. In embodiments of the present disclosure, it is illustrated that the second damper 185 is coupled to surround the second support protrusion 183 as an example.

As shown in FIGS. 3 and 4, the second damper 185 is formed in a substantially rectangular ring shape, as shown in FIG. 6, a seating groove 184 to which the second damper 185 is coupled may be provided on the outer peripheral side of the second support protrusion 183.

Moreover, a protrusion 143 protruding in the radial direction and extending in the axial direction is provided on the inner peripheral side of the gear housing 140, and an insertion groove 177 into which the protrusion 143 is inserted is provided on the outer peripheral side of the ring gear 170.

Therefore, the ring gear 170 is fixed to the gear housing 140 so as not to rotate, and the circumferential assembly position of the first support protrusion 175 is determined.

The ring gear 170 is provided with a through hole 171 passing through one end and the other end in the axial direction, and an inner peripheral bulkhead 145 having a communication hole 145*a* communicating with the through hole 171 is provided on the inner peripheral side of the gear housing 140.

And, the fastening member 201 is coupled to the through hole 171 and the communication hole 145*a* so that the ring gear 170 is fixed in the circumferential direction in the gear housing 140.

The gear housing 140 has a body portion 141 having a substantially cylindrical shape and a fastening flange 144 and a coupling flange 142 at both ends of the body portion 141 in the axial direction.

The fastening flange 144 provided with a fastening hole 144*a* is formed at the outer end of the gear housing 140 in the axial direction, and a cover member 155 having a communication hole 156*a* communicating with the fastening hole 144*a* is coupled to the fastening flange 144.

The cover member 155 prevents foreign substances from being introduced into the gear housing 140 from the outside by sealing the inside of the gear housing 140.

Also, a coupling flange 142 having a coupling hole 142*a* is formed at the inner end of the gear housing 140 in the axial direction and is coupled to the lower end of the steering column 100 as a coupling member.

An insertion end 157 inserted into the inner periphery of the gear housing 140 is provided at a portion adjacent to the edge of the cover member 155, and the insertion end 157 is supported and coupled to the inner circumferential surface of the gear housing 140.

Moreover, a cylinder portion 159 protruding in the axial direction is provided at the center of the inner surface of the cover member 155. A rotation support member 190 is coupled to an end of the steering shaft 103, and an outer peripheral side of the rotation support member 190 is supported and coupled to the inside of the cylinder portion 159 of the cover member 155.

The center of the carrier 180 is provided with a shaft through hole 186 through which the steering shaft 103 passes. A protruding support portion 187 protruding in the axial direction to support the rotation support member 190 in the axial direction is provided around the shaft through hole 186.

Accordingly, one end and the other end of the rotation support member 190 are supported by the cover member 155 and the protruding support portion 187 and can be fixed in the axial direction.

In addition, a rotation support member 127 for supporting the rotation of the steering shaft 103 is coupled between the outer circumferential surface of the steering shaft 103 and the inner circumferential surface of the column housing 125. A protruding end 147 for supporting the rotation support member 127 in the axial direction is provided at the center of the inner end of the gear housing 140 in the axial direction.

Accordingly, the protruding end 147 of the gear housing 140 is supported and coupled to the inner circumferential surface of the column housing 125 to support the rotation support member 127 in the axial direction.

According to the embodiments of the present disclosure, there is provided a steer by wire type steering apparatus that increases a driver's steering feel and steering safety by preventing the steering wheel from mechanically rotating any more when the rotation of the vehicle wheel reaches the maximum point.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A steer by wire type steering apparatus, comprising:
   a sun gear coupled to a steering shaft connected to a steering wheel operated by a driver and rotating in interlocking motion;
   a planetary gear externally coupled to the sun gear;
   a ring gear to which the planetary gear is internally coupled, two first support protrusions are provided at adjacent positions in a circumferential direction from one end of the ring gear of an axial direction, and at least one of the first support protrusions is coupled to and fixed to an inner circumferential surface of a gear housing; and
   a carrier to which a rotation shaft of the planetary gear is coupled and provided with a second support protrusion supported by at least one of the first support protrusions on an outer circumferential side.

2. The steer by wire type steering apparatus of claim 1, wherein at least one of the first support protrusions protrudes in an axial direction from one end of the axial direction of the ring gear, and an inner periphery of at least one of the first support protrusions is radially spaced apart from an outer periphery of the carrier.

3. A steer by wire type steering apparatus, comprising:
   a sun gear coupled to a steering shaft connected to a steering wheel operated by a driver and rotating in interlocking motion;
   a planetary gear externally coupled to the sun gear;
   a ring gear to which the planetary gear is internally coupled, a first support protrusion is provided at one end of the axial direction, and is coupled to and fixed to an inner circumferential surface of a gear housing; and
   a carrier to which a rotation shaft of the planetary gear is coupled and provided with a second support protrusion supported by the first support protrusion on an outer circumferential side,
   wherein a first damper supported by the second support protrusion and elastically deformed is provided on a circumferential side surface of the first support protrusion.

4. A steer by wire type steering apparatus, comprising:
   a sun gear coupled to a steering shaft connected to a steering wheel operated by a driver and rotating in interlocking motion;
   a planetary gear externally coupled to the sun gear;
   a ring gear to which the planetary gear is internally coupled, a first support protrusion is provided at one end of the axial direction, and is coupled to and fixed to an inner circumferential surface of a gear housing; and
   a carrier to which a rotation shaft of the planetary gear is coupled and provided with a second support protrusion supported by the first support protrusion on an outer circumferential side,
   wherein the second support protrusion protrudes in a radial direction from an outer circumferential side of the carrier, and a radial end of the second support protrusion is radially spaced apart from an inner circumferential side of the gear housing, and
   wherein the second support protrusion is provided with a second damper supported by the first support protrusion and elastically deformed.

5. The steer by wire type steering apparatus of claim 4, wherein the second damper is formed in a ring shape and a seating groove to which the second damper is coupled is provided on an outer peripheral side of the second support protrusion.

6. The steer by wire type steering apparatus of claim 1, wherein a protrusion protruding in a radial direction and extending in an axial direction is provided on an inner periphery of the gear housing, and an insertion groove into which the protrusion is inserted is provided at an outer periphery of the ring gear.

7. The steer by wire type steering apparatus of claim 6, wherein the ring gear is provided with a through hole passing through one end and the other end in the axial direction, and a communication hole communicating with the through hole is formed on an inner peripheral side of the gear housing.

8. The steer by wire type steering apparatus of claim 7, wherein the ring gear and the gear housing are coupled by a fastening member through the through hole and the communication hole, so that the position of the ring gear in a circumferential direction is fixed in the gear housing.

9. The steer by wire type steering apparatus of claim 1, wherein a fastening flange having a fastening hole is formed at an outer end of the gear housing in the axial direction, and a cover member having a communication hole communicating with the fastening hole is coupled to the fastening flange to seal an inside of the gear housing.

10. The steer by wire type steering apparatus of claim 9, wherein an insertion end inserted into an inner periphery of the gear housing is provided at a portion adjacent to an edge of the cover member.

11. The steer by wire type steering apparatus of claim 10, wherein a cylinder portion protruding in an axial direction is provided at a center of the inner surface of the cover member.

12. The steer by wire type steering apparatus of claim 11, wherein a rotation support member is coupled to an end of the steering shaft, and an outer peripheral side of the rotation support member is supported and coupled to an inside of the cylinder portion of the cover member.

13. The steer by wire type steering apparatus of claim 12, wherein a shaft through hole through which the steering shaft passes is provided in a center of the carrier, and a protruding support portion protruding in an axial direction to support the rotation support member in the axial direction is provided around the shaft through hole.

14. The steer by wire type steering apparatus of claim 9, wherein a coupling flange having a coupling hole is formed at an inner end of the gear housing in an axial direction to be coupled to column housing.

15. The steer by wire type steering apparatus of claim 14, wherein a rotation support member for supporting the rotation of the steering shaft is coupled between an outer circumferential surface of the steering shaft and an inner circumferential surface of the column housing.

16. The steer by wire type steering apparatus of claim 15, wherein a protruding end for supporting the rotation support member in an axial direction is provided at a central portion of an inner end of the gear housing in an axial direction.

* * * * *